US007002449B2

(12) United States Patent
Sugawara

(10) Patent No.: US 7,002,449 B2
(45) Date of Patent: Feb. 21, 2006

(54) KEYLESS ENTRY FOR EXECUTING IMMOBILIZER AUTHENTICATION

(75) Inventor: Takehito Sugawara, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 395 days.

(21) Appl. No.: 10/614,572

(22) Filed: Jul. 7, 2003

(65) Prior Publication Data

US 2004/0104804 A1 Jun. 3, 2004

(30) Foreign Application Priority Data

Jul. 9, 2002 (JP) ............................. 2002-200173

(51) Int. Cl.
*G06F 7/04* (2006.01)
(52) U.S. Cl. .................. 340/5.61; 340/5.72; 340/5.31; 307/10.5
(58) Field of Classification Search ............... 340/5.61, 340/5.62, 5.63, 5.64, 5.72, 5.31, 426.11, 426.13, 340/426.36, 10.5
See application file for complete search history.

(56) References Cited

U.S. PATENT DOCUMENTS 5,945,906 A * 8/1999 Onuma ..................... 340/5.62
6,043,752 A   3/2000 Hisada et al.

FOREIGN PATENT DOCUMENTS

EP    0 767 286 A2    9/1997
EP    1 142 764 A2    10/2001

* cited by examiner

*Primary Examiner*—Edwin C. Holloway, III
(74) *Attorney, Agent, or Firm*—Brinks Hofer Gilson & Lione

(57) ABSTRACT

Keyless entry includes a plurality of mobile devices each capable of fitting thereto a transponder for immobilizer authentication and a car-mounted device having a mobile device communication portion for communicating with the mobile devices and an immobilizer authentication portion for executing immobilizer authentication by making communication with the transponders. The immobilizer authentication portion includes a transmission/reception portion for communicating with the transponders, an ID preservation portion for storing and preserving IDs of transponders that have already been registered and a combination ID preservation portion for storing and preserving combinations of IDs of the registered mobile devices and IDs of the transponders fitted to the mobile devices. When executing immobilizer authentication, the immobilizer authentication portion extracts the combination of the ID of the mobile device lastly making communication and the ID of the transponder from the combination ID preservation portion, and executes first the authentication process for the transponder having the ID so extracted.

2 Claims, 4 Drawing Sheets

SETTING OF AUTHENTICATION SEQUENCE

FIG. 4A

| MOBILE DEVICE | TRANSPONDER |
|---|---|
| A | b |
| B | a |
| C | c |
| D | d |
| E | e |

FIG. 4B

| COMMUNICATION SEQUENCE OF MOBILE DEVICE |
|---|
| D |
| A |
| B |
| C |
| E |

FIG. 4C

| SEQUENCE OF IMMOBILIZER AUTHENTICATION |
|---|
| d |
| b |
| a |
| c |
| e |

KEYLESS ENTRY FOR EXECUTING IMMOBILIZER AUTHENTICATION

BACKGROUND OF THE INVENTION

1. Field of the Invention

This invention relates to keyless entry for executing immobilizer authentication. More particularly, the invention relates to keyless entry for executing immobilizer authentication that sequentially executes an authentication process from a transponder having a high possibility of authentication by utilizing a combination of an ID of a mobile device that has already been registered with an ID of a transponder when authentication of the transponder fitted to and used in the mobile device is executed, and shortens an authentication time.

2. Description of the Related Art

As a heretofore known passive remote keyless entry (RKE), a system construction is known in which a mechanical key for starting and operating an ignition of a motorcar can be fitted to a mobile device and a transponder is incorporated, and which has an immobilizer function for giving permission of an engine start through wireless communication. According to this passive keyless entry function, communication is first made between a mobile device and a car-mounted device, the car-mounted device releases door lock of a door on the driver's seat side when the mobile device is authenticated as being proper through that communication, and a driver can then open the door on the driver's seat side and can get into the motorcar. When the car-mounted device communicates with the transponder and authenticates the transponder as being proper through that communication, the immobilizer function permits the starting operation of the ignition. When this setting is made, the driver can start and operate the ignition by use of a mechanical key.

The communication ma-de in this case between the car-mounted device and the transponder is as follows. First, the car-mounted device transmits a request signal containing a password and a cipher code of a random number to the transponder. Next, the transponder returns an answer signal containing an answer message and an ID inherent to the transponder in response to the request signal. Receiving this answer signal, the car-mounted device permits the starting operation of the ignition when it authenticates the answer message and the ID as being correct. This authentication procedure is referred to as "immobilizer authentication".

Generally, a plurality of mobile devices is used for one car-mounted device in most cases in passive remote keyless entry. In this case, the same number of transponders as that of mobile devices exists. When the numbers of these transponder and mobile device are plural, the number of times of communication made between the transponders and the car-mounted device becomes the same in the worst case as the number of the mobile devices. In consequence, the time until immobilizer authentication is made and the ignition can be started gets elongated, and the driver may feel the waiting time too long.

To shorten such a waiting time as much as possible, means has been employed that stores a transponder to which access is lastly made, and starts an access from the transponder so stored when the next access is made.

The means described above is effective when only one driver uses a motorcar substantially exclusively. When all the members of a family or a plurality of people uses one motorcar as in the case of America and Europe, however, the transponder lastly accessed is not always used next time even when this transponder is stored, and the means cannot be said to be always effective.

SUMMARY OF THE INVENTION

With the technical background described above, it is an object of the invention to provide keyless entry for executing immobilizer authentication that makes it possible to execute immobilizer authentication with a smaller number of times of access by always storing a combination of an ID of a mobile device and an ID of a transponder.

To accomplish the object described above, the invention provides keyless entry for executing immobilizer authentication, comprising a plurality of mobile devices each capable of fitting thereto a transponder for immobilizer authentication; and a car-mounted device including a mobile device communication portion for communicating with a plurality of mobile devices and an immobilizer authentication portion for executing immobilizer authentication through communication with the transponders; wherein the immobilizer authentication portion includes a transmission/reception portion for conducting communication by wireless signals with the transponders, an ID preservation portion for storing and preserving IDs of registered transponders, a combination ID preservation portion for storing and preserving a combination of an ID of a registered mobile device and an ID of a transponder fitted to the registered mobile device, and means for extracting a combination of an ID of a mobile device lastly making communication and an ID of a transponder from the combination ID preservation portion when the immobilizer authentication portion executes immobilizer authentication, and for executing an immobilizer authentication process first for the transponder having the ID so extracted.

According to the means described above, when making communication with the mobile device, the car-mounted device makes communication not only with the mobile device but also with the transponder fitted to the mobile device, acquires the ID of the mobile device and the ID of the transponder during these communications and stores the IDs as a combination ID. Therefore, it is possible to make access by calling the ID of the corresponding transponder from the ID of the mobile device that lastly makes communication, and immobilizer authentication can be made with a smaller number of times of access.

In this case, when the immobilizer authentication portion in the means described above cannot make immobilizer authentication in the first immobilizer authentication process, the immobilizer authentication portion extracts a combination of the ID of the mobile device immediately ahead of the mobile device that lastly made communication and the ID of the transponder from the combination ID preservation portion, and executes again the authentication process for the transponder having the ID so extracted.

According to such a construction, even when authentication of the transponder first accessed proves unsuccessful, the combination of the ID of the mobile device immediately ahead of the mobile device that lastly made communication and the ID of the transponder is acquired from the combination ID preservation portion and the authentication process is again executed for the transponder thus acquired. In this way, immobilizer authentication can be executed with a higher probability and with a smaller number of times of access, too.

BRIEF DESCRIPTION OF THE DRAWINGS

FIG. 4 is an explanatory view useful for explaining the relation among the combination ID stored and preserved in the combination ID preservation portion, the latest communication sequence of mobile devices and a sequence of immobilizer authentication.

DESCRIPTION OF THE PREFERRED EMBODIMENTS

Preferred embodiments of the invention will be explained hereinafter with reference to the accompanying drawings.

Figure 1:
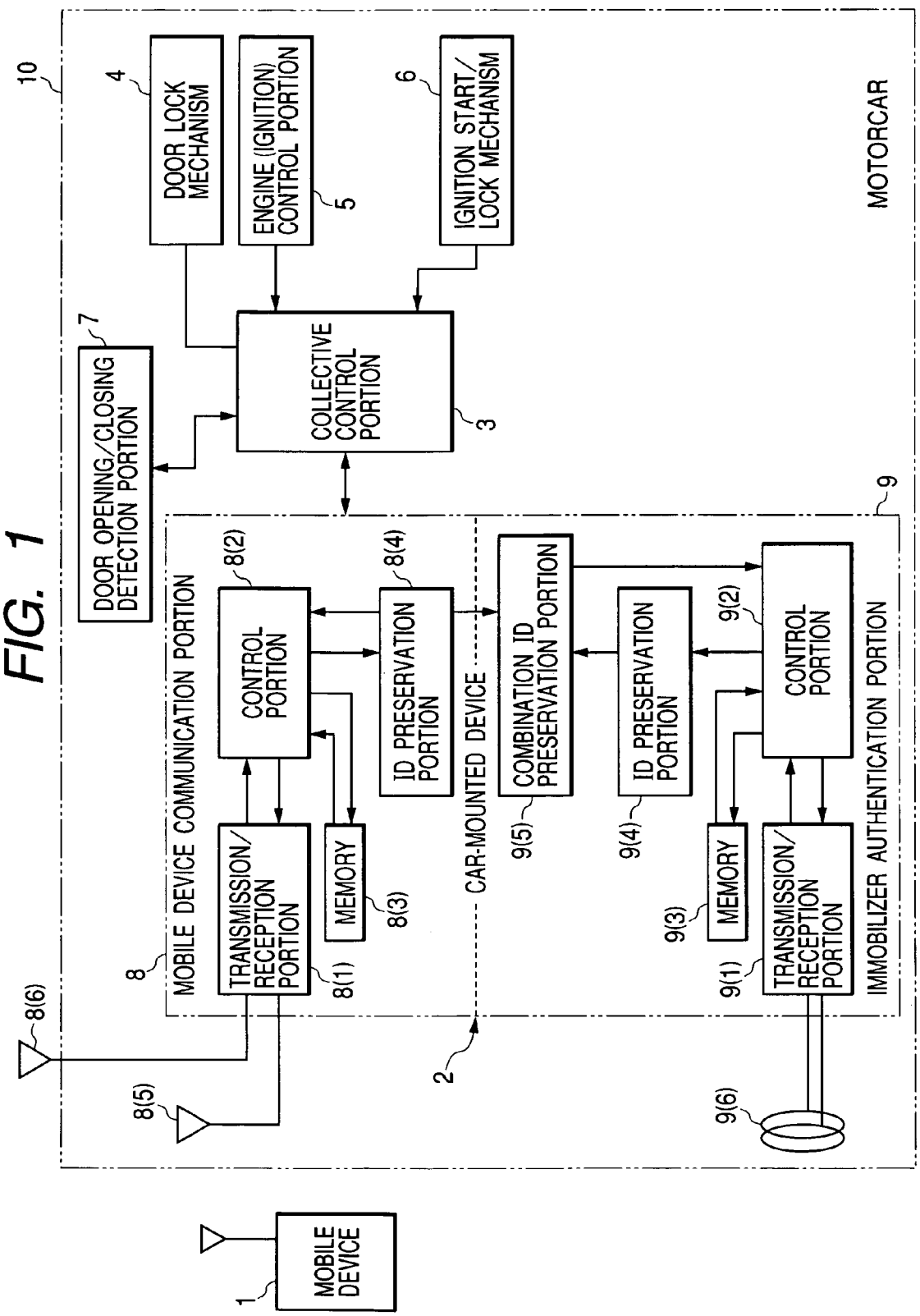
FIG. 1 shows keyless entry for executing immobilizer authentication according to an embodiment of the invention, and is a block diagram showing its principal construction and its peripheral portion.

FIG. 1 shows keyless entry for executing immobilizer authentication according to an embodiment of the invention, and is a block diagram showing its principal construction and its peripheral portion.

Keyless entry for executing immobilizer authentication according to this embodiment includes a mobile device 1 each user carries around and a car-mounted device 2 mounted to a motorcar 10 as shown in FIG. 1. The motorcar 10 includes a collective control portion 3, a door lock mechanism 4, an engine (ignition) control portion 5, an ignition start/lock mechanism 6 and a door opening/closing detection portion 7.

The car-mounted device 2 includes a mobile device communication portion 8 and an immobilizer authentication portion 9. The mobile device communication portion 8 includes a transmission/reception portion 8 (1), a control portion 8 (2), a memory 8 (3), an ID preservation portion 8 (4), an inner car antenna 8 (5) and an outer car antenna 8 (6). The immobilizer authentication portion 9 includes a transmission/reception portion 9 (1), a control portion 9 (2), a memory 9 (3), an ID preservation portion 9 (4), a combination ID preservation portion 9 (5) and an immobilizer antenna 9 (6).

The collective control portion 3 is connected to each of the car-mounted device 2, the door lock mechanism 4, the engine (ignition) control portion 5, the ignition start/lock mechanism 6 and the door opening/closing detection portion 7. The transmission/reception portion 8 (1) is connected to the inner car antenna 8 (5) and the outer car antenna 8 (6) inside the mobile device communication portion 8, and is also connected to the control portion 8 (2). The control portion 8 (2) is connected to the memory 8 (3) and to the ID preservation portion 8 (4). The ID preservation portion 8 (4) is connected to the combination ID preservation portion 9 (5), too. Inside the immobilizer authentication portion 9, the transmission/reception portion 9 (1) is connected to the immobilizer antenna 9 (5) and to the control portion 9 (2). The control portion 9 (2) is connected to each of the memory 9 (3), the ID preservation portion 9 (4) and the combination ID preservation portion 9 (5).

Keyless entry of the embodiment for executing immobilizer authentication, having the construction described above operates in the following manner.

To begin with, the mobile device communication portion 8 in the car-mounted device 2 repeatedly transmits request signals of radio wave wireless signals from the transmission/reception portion 8 (1) through the outer car antenna 8 (6) under control of the control portion 8 (2). When the user (driver) carrying the mobile device 1 approaches the motorcar 10, the mobile device 1 receives the request signal. Receiving the request signal, the mobile device 1 transmits an answer signal of a radio wave wireless signal in response to the request signal. The transmission/reception portion 8 (1) in the car-mounted device 2 receives the answer signal transmitted from the mobile device 1 through the outer car antenna 8 (6) and supplies the signal to the control portion 8 (2). When the answer signal is supplied, the control portion 8 (2) extracts an ID that is contained in the answer signal and is unique to the mobile device 1, and compares the ID so extracted with ID registered to the ID preservation portion 8 (4). When the extracted ID is judged as coincident with any of IDs registered, the control portion 8 (2) supplies a control signal contained in the answer signal such as a control signal for releasing the door lock mechanism 4 to the collective control portion 3. The collective control portion 3 supplies a release signal to the door lock mechanism 4 in accordance with the control signal so supplied and sets the door lock mechanism 4 to the release state.

Next, the user (driver) opens the door thus released and gets into the motorcar 10 while carrying the mobile device 1. Then, the door opening/closing detection portion 7 detects the door opening/closing state when the user (driver) gets into the motorcar, and supplies a door opening/closing detection signal to the collective control portion 3. The collective control portion 3 notifies the car-mounted device 2 of the reception of the door opening/closing signal. Receiving this notice from the collective control portion 3, the car-mounted device 2 communicates with the mobile device 1 through the inner car antenna 8 (5), and brings the immobilizer authentication portion 9 into the operative condition after confirming that the mobile device 1 exists inside the motorcar.

At this time, the immobilizer authentication portion 9 transmits a request signal of a wireless signal from the transmission/reception portion 9 (1) to the transponder of the mobile device 1 inside the motorcar 10 under control of the control portion 9 (2) and the transponder receives the request signal. Receiving the request signal, the transponder responds to the request signal and transmits an answer signal of a wireless signal. The transmission/reception portion 9 (1) of the immobilizer authentication portion 9 receives this answer signal through the immobilizer antenna 9 (6). The immobilizer authentication portion 9 (1) supplies the answer signal to the control portion 9 (2). Receiving the answer signal, the control portion 9 (2) extracts an ID that is contained in the answer signal and is inherent to the transponder, and compares the ID so extracted with an ID set to the foremost position of the IDs registered in the ID preservation portion 9 (4). When these IDs are judged as coincident, the control portion 9 (2) authenticates the transponder that makes communication.

When the control portion 9 (2) authenticates the transponder, it notifies the collective control portion 3 of the authentication of the transponder. Receiving this notice, the collective control portion 3 supplies a release signal to the ignition start/lock mechanism 6. The ignition start/lock mechanism 6 releases inhibition of the rotating operation of a mechanical key inside a key cylinder and sets this mechanism 6 so that the starting operation of ignition can be made. Owing to this setting, the user (driver) can make the ignition start operation and can start the engine by use of the mechanical key fitted to the mobile device 1.

In keyless entry according to this embodiment, the immobilizer authentication portion 9 is provided with the combination ID preservation portion 9 (5), and stores the combination ID of the ID of the mobile device 1 and the ID of the built-in transponder of that mobile device 1. When the transponder is authenticated, the ID of the foremost transponder is set to the ID combined with the ID of the mobile device 1 that has lastly made communication with the mobile communication portion 8. The ID of the transponder of the next sequence is set to the ID combined with the ID of the mobile device 1 that has made communication with the mobile communication portion 8 just ahead of the last mobile device 1. Setting is similarly made for the IDs of the subsequent transponders.

Figure 2:
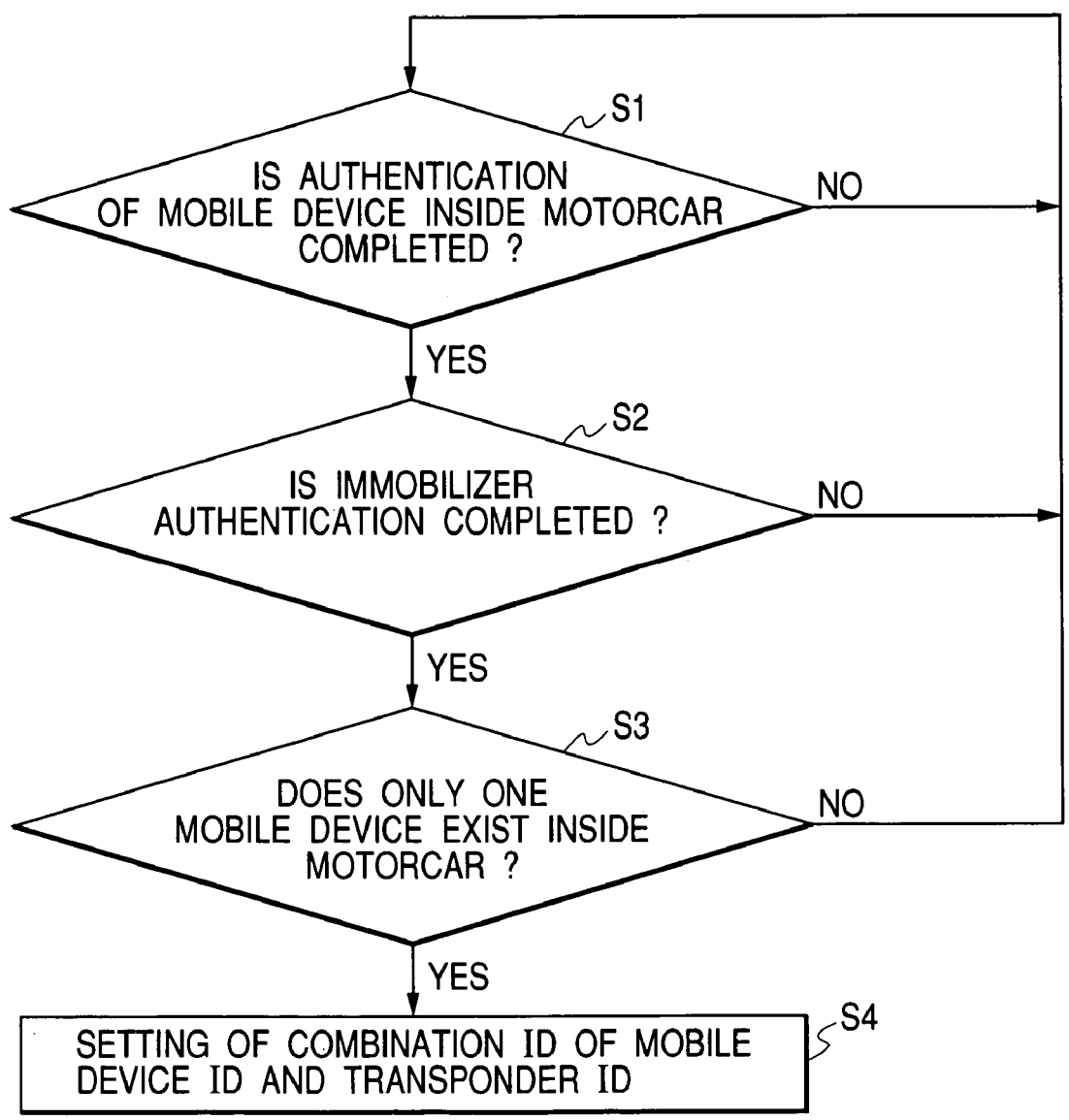
FIG. 2 is a flowchart showing an operation procedure when a combination ID stored and preserved in a combination ID preservation portion is set.

FIG. 2 is a flowchart showing the operation process when the combination ID to be stored and preserved in the combination ID preservation portion 9 (5) is set.

The setting operation of the combination ID by the control portion 9 (2) of the immobilizer authentication portion 9 will be explained with reference to this flowchart.

First, in Step S1, the control portion 9 (2) judges whether or not the mobile device 1 exists inside the motorcar by the method described above, and then judges whether or not its authentication is completed when the mobile device 1 exists. When authentication of the mobile device 1 inside the motorcar is judged as complete (Y), the flow proceeds to next Step S2. When authentication of the mobile device 1 inside the motorcar is not judged as complete (N), Step S1 is repeatedly executed.

In next Step S2, the control portion 9 (2) judges whether or not immobilizer authentication is completed. When immobilizer authentication is judged as complete (Y), the flow proceeds to next Step S3. When immobilizer authentication is not judged as complete (N), the flow returns to the previous Step S1 and the operation after Step S1 is again executed repeatedly.

In Step S3, the control portion 9 (2) judges whether or not only one mobile device 1 exists inside the motorcar 10. When the control portion 9 (2) judges that only one mobile device 1 exists (Y), the flow proceeds to next Step S4. When the control portion 9 (2) judges that more than one mobile devices 1 exist (N), the flow returns to the previous Step S1, and the operation after Step S1 is again executed repeatedly.

In Step S4, the control portion 9 (2) sets the ID of one mobile device 1 inside the motorcar 10 and the ID of the immobilizer authenticated to the combination ID and supplies the combination ID so set to the combination ID preservation portion 9 (5) for storage and preservation.

Figure 3:
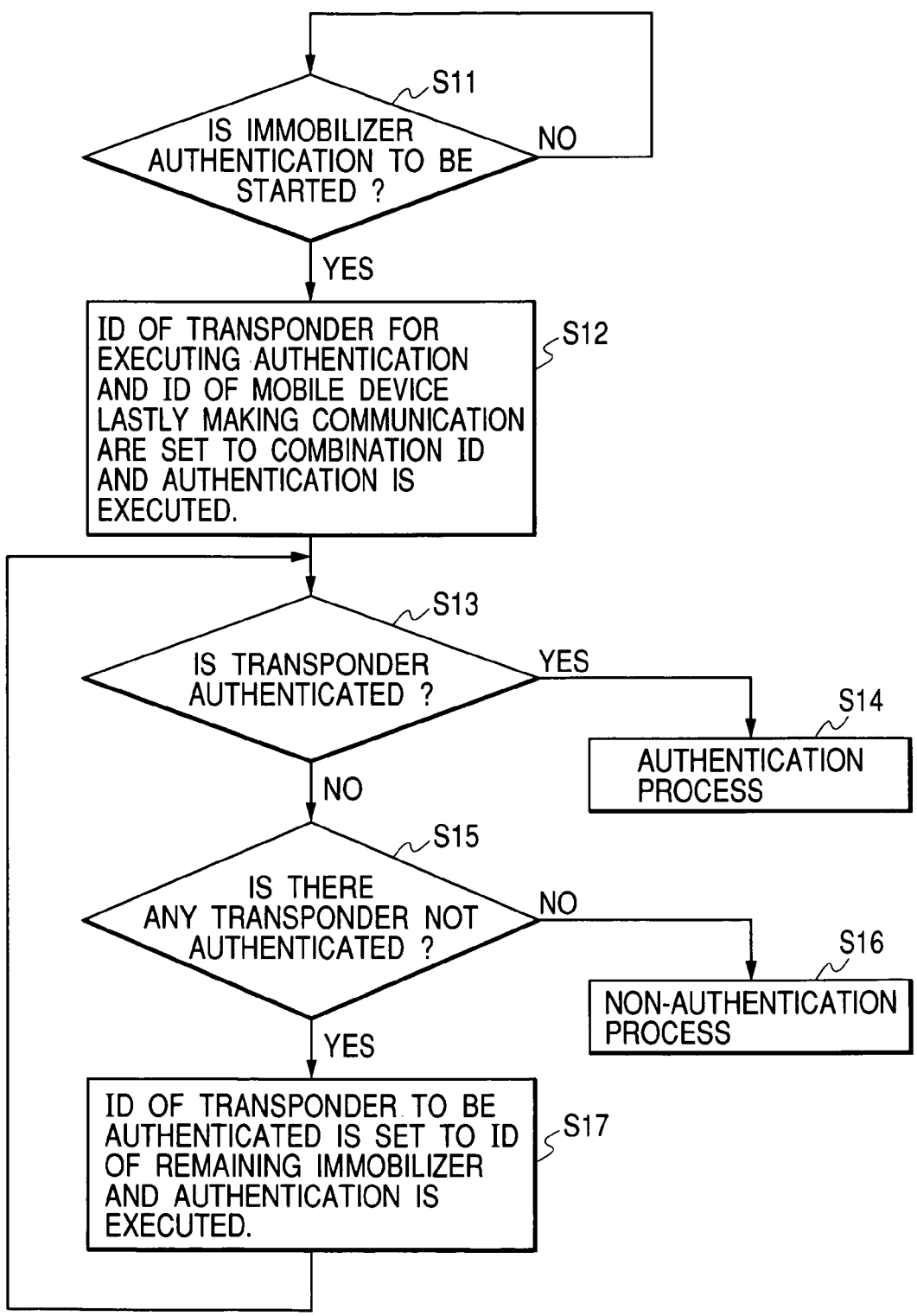
FIG. 3 is a flowchart showing an operation procedure when an authentication sequence is set to the combination ID preserved in the combination ID preservation portion.

FIG. 3 is a flowchart showing an operation process when an authentication sequence is set to the combination ID stored and preserved in the combination ID preservation portion 9 (5).

The setting operation of the combination ID authentication sequence by the control portion 9 (2) of the immobilizer authentication portion 9 will be explained with reference to this flowchart.

In the first Step S11, the control portion 9 (2) judges whether or not immobilizer authentication be started. More concretely, after immobilizer authentication is started after opening/closing of the door is detected from the signal from the door opening/closing detection portion 7, the existence of the mobile device 1 inside the motorcar is detected through the inner car antenna 8 (5) and authentication of that mobile device 1 is completed. The flow proceeds to next Step S12 when judgment is made to the effect that immobilizer authentication be started (Y). When judgment is made that immobilizer authentication is not to be started (N), on the other hand, Step S11 is executed repeatedly.

In next Step S12, the control portion 9 (2) reads out the ID of the transponder to be authenticated this time from the combination ID stored in the combination ID preservation portion 9 (5) by reading out the ID of the mobile device 1 that lastly makes communication with the mobile device communication portion 8, that is, the combination ID containing the ID of the mobile device 1 authenticated as existing inside the motorcar. The control portion 9 (2) then sets the ID to the ID of the transponder combined, and executes authentication.

In Step S13, the control portion 9 (2) judges whether or not the transponder is authenticated. The flow proceeds to next Step S14 when the transponder is judged as authenticated (Y). The flow proceeds to another Step S15 when the transponder is not judged as authenticated (N).

In subsequent Step S14, the control portion makes setting so that the start operation of ignition can be made, through the collective control portion 3 because the transponder is authenticated.

In subsequent Step S15, the control portion 9 (2) judges whether or not any transponders not yet authenticated exist. The flow proceeds to next Step S16 when the transponders not yet authenticated are not judged as existing (N). When the transponders not yet authenticated are judged as existing (Y), on the other hand, the flow proceeds to another Step S17.

In Step S16, the control portion 9 (2) does not execute any more immobilizer authentication because the transponders that are not yet authenticated do not exist any more.

In Step S17, the control portion 9 (2) sets the ID of the transponder to be authenticated this time to the ID of the remaining transponder and executes authentication. The flow thereafter returns to Step S13 and the operations after Step S13 are again executed.

FIGS. 4A, 4B and 4C are explanatory views showing the relation of the combination ID stored in the combination ID preservation portion 9 (5), the latest communication sequence of the mobile devices and the sequence of immobilizer authentication. FIG. 4A shows the combination ID, FIG. 4B shows the latest communication sequence of the mobile devices and FIG. 4C does the sequence of immobilizer authentication.

As the combination of the ID of the mobile device and the ID of the transponder, the mobile device A stores and preserves the transponder b, the mobile device B does the transponder a, the mobile device C does the transponder c, the mobile device D does the transponder d and the mobile device E does the transponder e as shown in FIG. 4A. Assuming that the latest communication sequence of the mobile devices is the mobile device D, the mobile device A, the mobile device B, the mobile device C and the mobile device E as shown in FIG. 4B, the authentication sequence of the transponders then becomes the transponder d, the transponder b, the transponder a, the transponder c and the transponder e as shown in FIG. 4C.

In keyless entry of this embodiment for executing immobilizer authentication, the ID of the mobile device 1 and the ID of the transponder are stored as the combination ID for the mobile device 1 and the transponder fitted to the mobile device 1, the mobile device that lastly made communication is selected and access is made to the transponder having the ID combined with the ID of that mobile device. Therefore, immobilizer authentication can be made with a smaller number of times of access.

As described above, according to a first aspect of the invention, the car-mounted device communicates not only with the mobile device but also with the transponder accessorial to the mobile device when the car-mounted device communicates with the mobile device, acquires the ID of the mobile device and the ID of the transponder in these communications and stores these IDs as the combination ID. Immobilizer authentication can be made by first gaining access to the transponder combined with the mobile device that lastly makes communication. Consequently, immobilizer authentication can be made with a smaller number of times of access.

According to a second aspect of the invention, even when authentication of the transponder first accessed proves unsuccessful, it is possible to execute again the authentication process with a high probability by acquiring the combination of the ID of the mobile device, that makes communication immediately ahead of the mobile device lastly making communication and the ID of the transponder from the combination ID preservation portion, and executing again the authentication process. Therefore, immobilizer authentication can be made with a smaller number of times of access.

What is claimed is:

1. Keyless entry for executing immobilizer authentication, comprising:
   a plurality of mobile devices each capable of fitting thereto a transponder for immobilizer authentication; and
   a car-mounted device including a mobile device communication portion for communicating with said plurality of mobile devices and an immobilizer authentication portion for executing immobilizer authentication through communication with said transponders;
   wherein said immobilizer authentication portion includes a transmission/reception portion for executing communication by wireless signals with said transponders, an ID preservation portion for storing and preserving ID of registered transponders, and a combination ID preservation portion for storing and preserving a combination of an ID of a registered mobile device and an ID of a transponder fitted to said registered mobile device, a combination of an ID of a mobile device lastly making communication and an ID of a transponder is extracted from said combination ID preservation portion when said immobilizer authentication portion executes immobilizer authentication, and an immobilizer authentication process is executed first for a transponder having the ID so extracted.

2. Keyless entry according to claim 1, wherein, when said immobilizer authentication fails to execute immobilizer authentication when said immobilizer execution portion executes a first immobilizer authentication process, said immobilizer authentication portion extracts a combination of an ID of a mobile device making communication immediately ahead of said mobile device lastly making communication and an ID of a transponder from said combination ID preservation portion, and executes again an authentication process for said transponder having the ID so extracted.

* * * * *